United States Patent
Miller et al.

(10) Patent No.: US 10,970,747 B2
(45) Date of Patent: Apr. 6, 2021

(54) ACCESS AND CONTROL FOR DRIVING OF AUTONOMOUS VEHICLE

(71) Applicant: Robert Bosch GmbH, Stuttgart (DE)

(72) Inventors: James Stephen Miller, Dexter, MI (US); Patrick Graf, Southfield, MI (US); Frank Riggi, Plymouth, MI (US)

(73) Assignee: ROBERT BOSCH GMBH, Stuttgart (DE)

(*) Notice: Subject to any disclaimer, the term of this patent is extended or adjusted under 35 U.S.C. 154(b) by 349 days.

(21) Appl. No.: 15/751,323

(22) PCT Filed: Sep. 2, 2016

(86) PCT No.: PCT/US2016/050111
§ 371 (c)(1),
(2) Date: Feb. 8, 2018

(87) PCT Pub. No.: WO2017/040929
PCT Pub. Date: Mar. 9, 2017

(65) Prior Publication Data
US 2018/0231979 A1    Aug. 16, 2018

Related U.S. Application Data

(60) Provisional application No. 62/214,416, filed on Sep. 4, 2015.

(51) Int. Cl.
*G06K 9/00* (2006.01)
*G05D 1/02* (2020.01)
(Continued)

(52) U.S. Cl.
CPC ....... *G06Q 30/0266* (2013.01); *G05D 1/0088* (2013.01); *G05D 1/0214* (2013.01);
(Continued)

(58) Field of Classification Search
CPC .............. G05D 1/0088; G05D 1/0214; G05D 2201/0212; G06K 9/00228;
(Continued)

(56) References Cited

U.S. PATENT DOCUMENTS 6,804,604 B2 * 10/2004 Yamazaki .......... G01C 21/3461
340/438
7,921,036 B1    4/2011 Sharma et al.
(Continued)

FOREIGN PATENT DOCUMENTS

WO    2013025803 A1    2/2013
WO    2015099679 A1    7/2015

OTHER PUBLICATIONS

Research on Dynamic Taxi Ride-Sharing Price Mode; Shun Xu;Changlong Yin;Qirui Zhang; 2020 5th International Conference on Electromechanical Control Technology and Transportation (ICECTT); IEEE Conference Paper (Year: 2020).*
(Continued)

*Primary Examiner* — Cuong H Nguyen
(74) *Attorney, Agent, or Firm* — Michael Best & Friedrich LLP

(57) ABSTRACT

A method and apparatus for controlling use of an autonomous vehicle includes an interior occupant sensing system to obtain data of occupants from a video camera. An occupant sensing controller is configured to receive the video and detect a number of faces of occupants disposed in the vehicle. Further, the occupant sensing controller determines demographic information from the video data of each of the detected faces and then stores the vehicle location, the number of faces, and the demographic information for occupants as data in the vehicle. The occupant sensing controller determines from the demographic information an age of occupants in the autonomous vehicle, and when the demographic information indicates that all occupants in the (Continued)

autonomous vehicle are less than a certain age, limits travel to a destination or operation of the autonomous vehicle in response to age. Further, the occupant sensing controller can recognize a specific authorized individual within the vehicle and limit usage of the vehicle for the identified authorized individual.

20 Claims, 8 Drawing Sheets

(51) Int. Cl.
    *G06Q 30/02* (2012.01)
    *G05D 1/00* (2006.01)
    *G06Q 30/06* (2012.01)
(52) U.S. Cl.
    CPC ..... *G06K 9/00228* (2013.01); *G06K 9/00838* (2013.01); *G06Q 30/0242* (2013.01); *G06Q 30/0269* (2013.01); *G06K 2009/00322* (2013.01); *G06Q 30/0645* (2013.01)
(58) Field of Classification Search
    CPC ..... G06K 9/00838; G06K 2009/00322; G06Q 30/0242; G06Q 30/0266; G06Q 30/0269; G06Q 30/0645; G06Q 10/025; G06Q 10/063114; G06Q 10/063116; G06Q 10/06398; G06Q 10/06314; G06Q 10/06311; G08G 1/205; G08G 1/207
    USPC .................................................. 701/23–28, 2
    See application file for complete search history.

(56) References Cited

U.S. PATENT DOCUMENTS

| | | | |
|---|---|---|---|
| 8,527,146 B1 | 9/2013 | Jackson et al. | |
| 9,205,805 B2* | 12/2015 | Cudak | B60R 25/241 |
| 9,308,891 B2* | 4/2016 | Cudak | B60K 35/00 |
| 9,552,564 B1* | 1/2017 | Martenis | G07C 5/008 |
| 9,557,856 B2* | 1/2017 | Send | G01S 17/66 |
| 9,610,510 B2* | 4/2017 | Comploi | A63G 25/00 |
| 9,702,349 B2* | 7/2017 | Anderson | B60G 13/14 |
| 9,802,638 B1 | 10/2017 | Stoffel | B62D 1/00 |
| 9,820,120 B2* | 11/2017 | deCharms | H04L 65/1059 |
| 9,958,864 B2* | 5/2018 | Kentley-Klay | G01S 17/87 |
| 10,021,254 B2* | 7/2018 | Doyle | H04N 1/00244 |
| 10,049,375 B1* | 8/2018 | Zappella | G06F 16/2322 |
| 10,139,824 B2* | 11/2018 | Sako | G08G 1/123 |
| 2001/0021895 A1* | 9/2001 | Yamazaki | G01C 21/3658 |
| | | | 701/435 |
| 2003/0233305 A1* | 12/2003 | Solomon | G06Q 30/08 |
| | | | 705/37 |
| 2005/0061949 A1 | 3/2005 | Decker et al. | |
| 2008/0027599 A1* | 1/2008 | Logan | G05D 1/0261 |
| | | | 701/23 |
| 2012/0239471 A1 | 9/2012 | Grimm et al. | |
| 2013/0308825 A1 | 11/2013 | Yamazaki | |
| 2014/0094987 A1 | 4/2014 | Healey et al. | |
| 2014/0099029 A1 | 4/2014 | Savvides et al. | |
| 2014/0156133 A1 | 6/2014 | Cullinane et al. | |
| 2014/0278781 A1 | 9/2014 | Liu et al. | |
| 2014/0278841 A1 | 9/2014 | Natinsky | |
| 2014/0327752 A1 | 11/2014 | Tsuda | |
| 2015/0232064 A1* | 8/2015 | Cudak | B60R 25/31 |
| | | | 701/23 |
| 2015/0233719 A1* | 8/2015 | Cudak | B60W 50/12 |
| | | | 701/23 |
| 2015/0235538 A1 | 8/2015 | Konigsberg et al. | |
| 2015/0242944 A1* | 8/2015 | Willard | G06Q 30/0284 |
| | | | 705/5 |
| 2015/0286340 A1* | 10/2015 | Send | G01J 1/0437 |
| | | | 345/175 |
| 2015/0324687 A1* | 11/2015 | Buibas | G06N 3/04 |
| | | | 706/23 |
| 2015/0379782 A1* | 12/2015 | Nakagawa | G07B 15/063 |
| | | | 705/13 |
| 2016/0125735 A1* | 5/2016 | Tuukkanen | G08G 1/202 |
| | | | 701/23 |
| 2016/0214533 A1* | 7/2016 | Doyle | H04N 1/00244 |
| 2016/0301698 A1* | 10/2016 | Katara | G07B 13/02 |
| 2017/0021282 A1* | 1/2017 | Comploi | B60W 50/10 |
| 2017/0123421 A1* | 5/2017 | Kentley | B60W 30/00 |
| 2017/0123423 A1* | 5/2017 | Sako | G05D 1/0088 |
| 2017/0234691 A1* | 8/2017 | Abramson | G01C 21/3484 |
| | | | 701/442 |
| 2018/0356821 A1* | 12/2018 | Kentley-Klay | G01S 17/87 |
| 2020/0172088 A1* | 6/2020 | Dudar | F02D 41/22 |

OTHER PUBLICATIONS

Real-Time Distributed Taxi Ride Sharing; Kanika Bathla;Vaskar Raychoudhury;Divya Saxena;Ajay D Kshemkalyani; 2018 21st International Conference on Intelligent Transportation Systems (ITSC); IEEE Conference Paper (Year: 2018).*
VoIP integration for mobile ride-sharing application; Mustafa Burak Amasyali;Ensar Gul; 2017 7th International Conference on Communication Systems and Network Technologies (CSNT); IEEE Conference Paper (Year: 2017).*
A Survey of Taxi Ride Sharing System Architectures; Shrawani Silwal;Md Osman Gani;Vaskar Raychoudhury; 2019 IEEE International Conference on Smart Computing (SmartComp); IEEE Conference Paper (Year: 2019).*
An Online Ride-Sharing Path-Planning Strategy for Public Vehicle Systems; Ming Zhu;Xiao-Yang Liu;Xiaodong Wang; IEEE Transactions on Intelligent Transportation Systems; vol. 20, Issue: 2; IEEE Journal Article (Year: 2019).*
Quantifying the Efficiency of Ride Sharing; Claudio Ruch;ChengQi Lu;Lukas Sieber;Emilio Frazzol; IEEE Transactions on Intelligent Transportation Systems; IEEE Early Access Article. (Year: 2020).*
Xhare-a-Ride: A Search Optimized Dynamic Ride Sharing System with Approximation Guarantee; Raja Subramaniam Thangaraj et al.; 2017 IEEE 33rd International Conference on Data Engineering (ICDE); IEEE Conference Paper (Year: 2017).*
Optimizing Order Dispatch for Ride-Sharing Systems; YubinDuan;Ning Wang;Jie Wu; 2019 28th International Conference on Computer Communication and Networks (ICCCN); IEEE Conference Paper (Year: 2019).*
International Preliminary Report on Patentability for Application No. PCT/US2016/050111 dated Mar. 15, 2018 (8 pages).
International Search Report and Written Opinion for Application No. PCT/US2016/050111 dated Nov. 7, 2016, (12 pages).
Office Action from the Japanese Patent Office for Application No. 2018-511741 dated Mar. 18, 2019 (13 pages).

* cited by examiner

ACCESS AND CONTROL FOR DRIVING OF AUTONOMOUS VEHICLE

RELATED APPLICATIONS

This application claims the benefit of U.S. Provisional Patent Application No. 62/214,416 filed Sep. 4, 2015, the entire contents of which are incorporated herein by reference.

BACKGROUND

The present invention relates to a method and apparatus for controlling access and usage of an autonomous vehicle.

Autonomous vehicles are known and are being tested on real world roadways. Issues exist with regard to access and control of the autonomous vehicle. In some instances, a child or youth may want to travel in an autonomous vehicle and issues are the age of a child or youth, along with the destination the child or youth wants to travel to. Embodiments are directed to providing such an arrangement.

SUMMARY

In one embodiment, the invention provides a method for controlling use of an autonomous vehicle including an interior occupant sensing system having an occupant sensing controller to obtain data of occupants including video data. The method includes operating at least one video camera to obtain the video data of occupants in the vehicle, providing the video data to the occupant sensing controller, and detecting a number of faces of occupants disposed in the vehicle. The method includes determining demographic information from the video data of each of the detected faces, storing a vehicle location, the number of faces, and the demographic information for occupants as data in the autonomous vehicle, determining from the demographic information an age of occupants in the autonomous vehicle, and when the demographic information indicates that all occupants in the autonomous vehicle are less than a certain age, limiting travel to a destination or operation of the autonomous vehicle in response to age.

Another embodiment provides a method for controlling use of an autonomous vehicle including an interior occupant sensing system to obtain data of occupants including video data. The method includes operating at least one video camera of the interior occupant sensing system to obtain the video data of occupants in the vehicle, providing the video data to an occupant sensing controller of the interior occupant sensing system; and recognizing a face of at least one occupant disposed in the vehicle. An occupant that is recognized is a specific authorized individual and routes and destinations of use of the autonomous vehicle are provided for the specific authorized individual. Different specific authorized individuals have different authorized routes and destinations of use and different authorized times of use.

Another embodiment provides a vehicle control system for access and operation of an autonomous vehicle. The vehicle control system includes a vehicle controller and an interior occupant sensing system to obtain data of occupants that includes video data. The interior occupant sensing system includes at least one video camera to obtain the video data of occupants in the vehicle and an occupant sensing controller for receiving the video data. The occupant sensing controller is configured to detect a number of faces of occupants disposed in the vehicle, determine demographic information from the video data of each of the detected number of faces, and store a vehicle location, the number of faces, and the demographic information for occupants as data in the vehicle. The occupant sensing controller is also configured to determine from the demographic information an age of occupants in the autonomous vehicle, and provide the demographic information including an age of occupants to the vehicle controller. Moreover, the vehicle controller is configured to, in response to the demographic information indicating that all occupants in the autonomous vehicle are less than a certain age, limit travel to a destination or operation of the autonomous vehicle in response to the certain age.

Other embodiments will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (e.g., stored on non-transitory computer-readable medium) executable by one or more processors. As such, it should be noted that a plurality of hardware and software based devices, as well as a plurality of different structural components may be utilized to implement the embodiments. For example, "processing units" and "controllers" described in the specification can include standard processing components, such as one or more processors, one or more memory modules including non-transitory computer-readable medium, one or more input/output interfaces, and various connections (e.g., a system bus) connecting the components.

Figure 1:
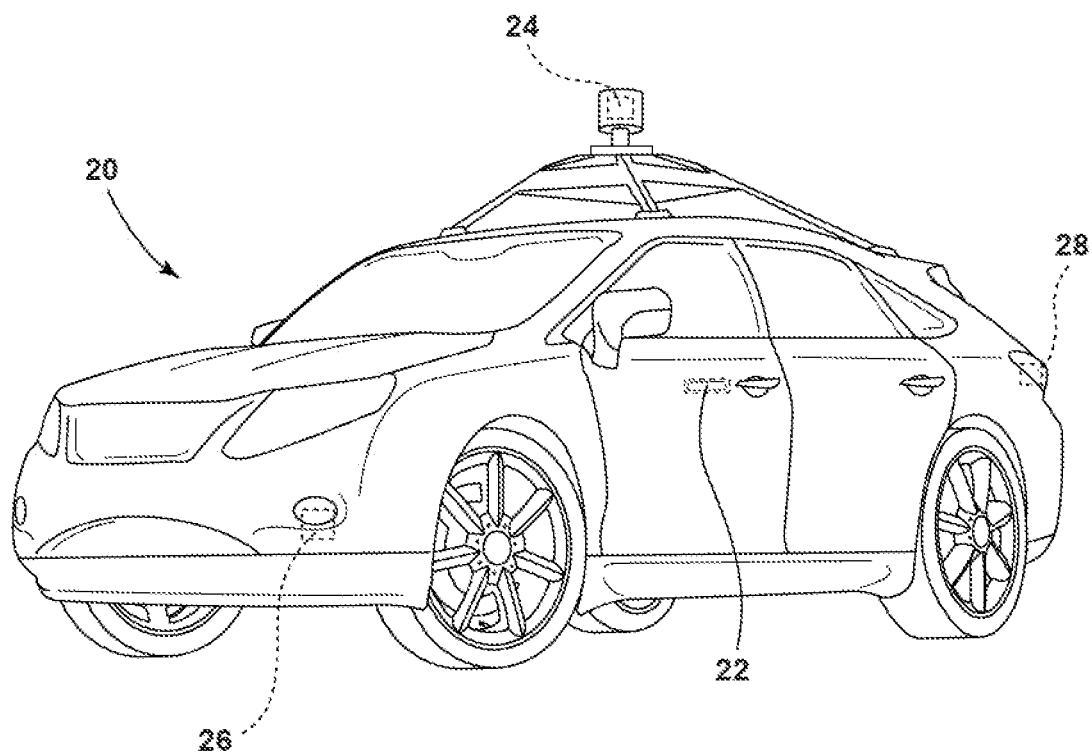
FIG. 1 is a perspective view of an autonomous vehicle, according to some embodiments.

FIG. 1 shows an autonomous vehicle 20, such as a driverless vehicle, that includes a fingerprint sensor 22 mounted to the exterior of the autonomous vehicle 20 for detecting a fingerprint of a specific authorized individual. Thus, in one embodiment, preselected persons obtain access to the autonomous vehicle 20. The autonomous vehicle 20 includes a laser identification detection and ranging (Lidar) sensor 24 mounted at a top of a vehicle hood to locate objects in plural directions. Further, FIG. 1 shows a frontwardly directed radar sensor 26 and a rearwardly directed radar sensor 28. Additional sensors are not illustrated in FIG. 1.

Figure 2:
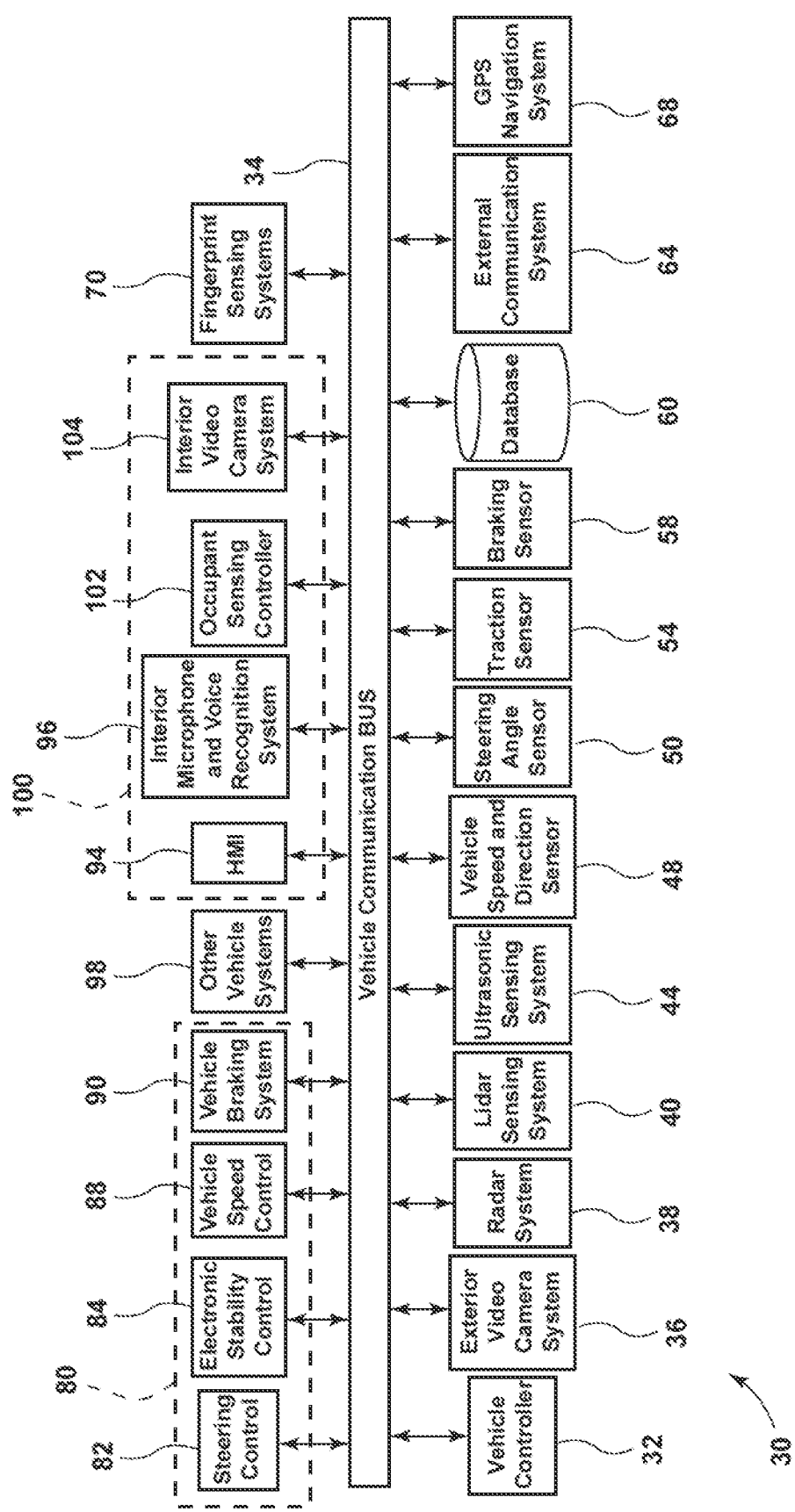
FIG. 2 is a block diagram of a control system for an autonomous vehicle and includes an interior occupant sensing system, according to some embodiments.

FIG. 2 shows an autonomous vehicle control system 30 for the autonomous vehicle 20. The autonomous vehicle control system 30 includes an electronic vehicle controller 32 for processing inputs and controlling the vehicle 20 via a communication bus 34. The vehicle communication bus 34, in some embodiments is one of a controller area network (CAN) bus, a Flex-Ray bus or an Ethernet bus. Other communication protocols are contemplated The arrows in FIG. 2 are for purposes of illustration showing communication over the communication bus 34.

The electronic vehicle controller 32 is in communication, over the vehicle communication bus 34, with an exterior video camera system 36 having one or more video cameras for obtaining video data in every direction about the vehicle 20. Further, a radar system 38 that includes the radar sensors 26, 28, and additional radar sensors (not shown), provides radar information to the electronic vehicle controller 32 via the vehicle communication bus 34 regarding objects disposed in the local area about the vehicle 20. A Lidar sensing system 40 includes the Lidar sensor 24 and an ultrasonic sensing system 44 includes one or a plurality of ultrasonic sensors oriented to sense the presence of objects disposed outwardly from the vehicle. The Lidar sensing system 40 and the ultrasonic sensing system 44 are provided for communication with the electronic vehicle controller 32 via the vehicle communication bus 34.

The autonomous vehicle control system 30 includes a vehicle speed and direction sensor 48 for detecting the speed and direction (forward/reverse) of the autonomous vehicle 20. A steering angle sensor 50 senses the steering angle of the vehicle and provides the angle to the electronic vehicle controller 32. A traction sensor 54 senses traction of the vehicle 20 and provides traction information to the electronic vehicle controller 32. Finally, a braking sensor 58 senses vehicle braking and provides braking information to the electronic vehicle controller 32 via the vehicle communication bus 34.

A database 60 shown in FIG. 2 stores data for the electronic vehicle controller 32 and programs for execution by a processor of the electronic vehicle controller 32 and other systems. Further, in some embodiments the database 60 stores digital road map information.

The vehicle control system 30 shown in FIG. 2 includes an external communication system 64. The external communication system includes hardware and software components that allow communication wirelessly using one or more modalities from the group consisting of cellular data, vehicle-to-everything (V2X), and Wi-Fi. Thus, the external communication system 64 is configured to communicate vehicle-to-vehicle (V2V) and vehicle to infrastructure (V2I) or with guidance beacons provided along a roadway. The external communication system 64 is a radio frequency (RF) transceiver or other wireless arrangement.

Further, the vehicle control system 30 shown in FIG. 2 includes a global position signal (GPS) navigation system 68. The GPS navigation system 68 receives GPS signals and is configured to determine the coordinates, and thus the location of the vehicle 20. The GPS navigation system 68 includes hardware and software for locating the vehicle using GPS signals. Further, the GPS navigation system 68 assists in determining or plotting routes to selected destinations.

Further, the vehicle control system 30 shown in FIG. 2 includes a fingerprint sensing system 70 that, in combination with the fingerprint sensor 22 thereof, provides access or entry into the autonomous vehicle 20 for different specific authorized individuals when a sensed fingerprint matches a stored fingerprint thereof. Other entry systems, such as a key fob, and facial recognition by processing images received from the exterior video camera system 36 are contemplated. In another embodiment, a keypad secured to the exterior of the vehicle 20 provides entry in response to a password. In another embodiment, a smart phone is enabled to provide an access signal to the vehicle 20 to provide entry therein. The smart phone is password protected or otherwise programmed to selectively provide the access signal. In response to the access signal or entry of a password into the keypad, one or more doors of the vehicle 20 are unlocked.

The vehicle control system 30 includes a vehicle drive control arrangement 80 that includes a steering control 82, an electronic stability control 84, a vehicle speed control 88, and a vehicle braking system 90 as shown in FIG. 2. Besides communicating with the electronic vehicle controller 32 and with each other over a vehicle communication bus 34, the steering control 82, the electronic stability control 84, the vehicle speed control 88, and the vehicle braking system 90 control the mode of operation of the autonomous vehicle 20. Further, other vehicle systems 98 communicate with the electronic vehicle controller 32 and with each other.

The human-machine interface (HMI) 94 shown in FIG. 2 provides an interface between the occupants of the autonomous vehicle 20 and all of the systems and controllers of the vehicle control system 30. The HMI 94 is coupled to the vehicle communication bus 34 and is configured to receive inputs from the occupants, receive data from the vehicle controller 32, and provide warnings or other information to the occupants based on the data. The HMI 94 includes suitable input and output mechanisms, including, for example, buttons and/or a touch-screen display having a graphical user interface (GUI). Further, an interior microphone and voice recognition system 96 is provided that receives voice commands from occupants of the vehicle 20 for processing.

Other vehicle systems 98 shown in FIG. 2 are contemplated. Other vehicle systems 98 include an entertainment system having hardware (e.g., a display screen) and software configured to provide video and audio entertainment content to occupants of the vehicle 20. In some embodiments, the entertainment content includes video content streamed through the external communication system 64.

In one embodiment, an interior occupant sensing system 100 shown in FIG. 2 is formed by the occupant sensing controller 102, along with the HMI 94, the interior microphone and voice recognition system 96, and an interior video camera system 104. The interior video camera system 104 obtains video images of occupants located within the autonomous vehicle 20.

In one embodiment, the occupant sensing controller 102 of the interior occupant sensing system 100 is integrated with the interior video camera system 104 and the interior microphone and voice recognition system 96 into a single device. In other embodiments, the occupant sensing controller 102 is part of a multi-camera system that includes interior and exterior digital video cameras. In some embodiments, the interior occupant sensing system 100 includes more than one interior digital video camera. The interior video camera system 104 is a digital video camera in one embodiment. The interior video camera system 104 is positioned to view the interior of the vehicle and the occupants of the autonomous vehicle 20. The occupant sensing controller 102 is configured to receive and process images or video data from the interior video camera system 104. The microphone of the interior microphone and voice recognition system 96 is positioned in the interior of the vehicle 20 and is configured to sense or detect sound (including voices), convert the sound or audio signal to audio data, and provide the audio data to the occupant sensing controller 102. The occupant sensing controller 102 is configured to receive and process the audio data from the interior microphone and voice recognition system 96. The interior microphone and voice recognition system 96 may stand alone or it may be part of another vehicle system (e.g., a hands-free cellular system).

Figure 3:
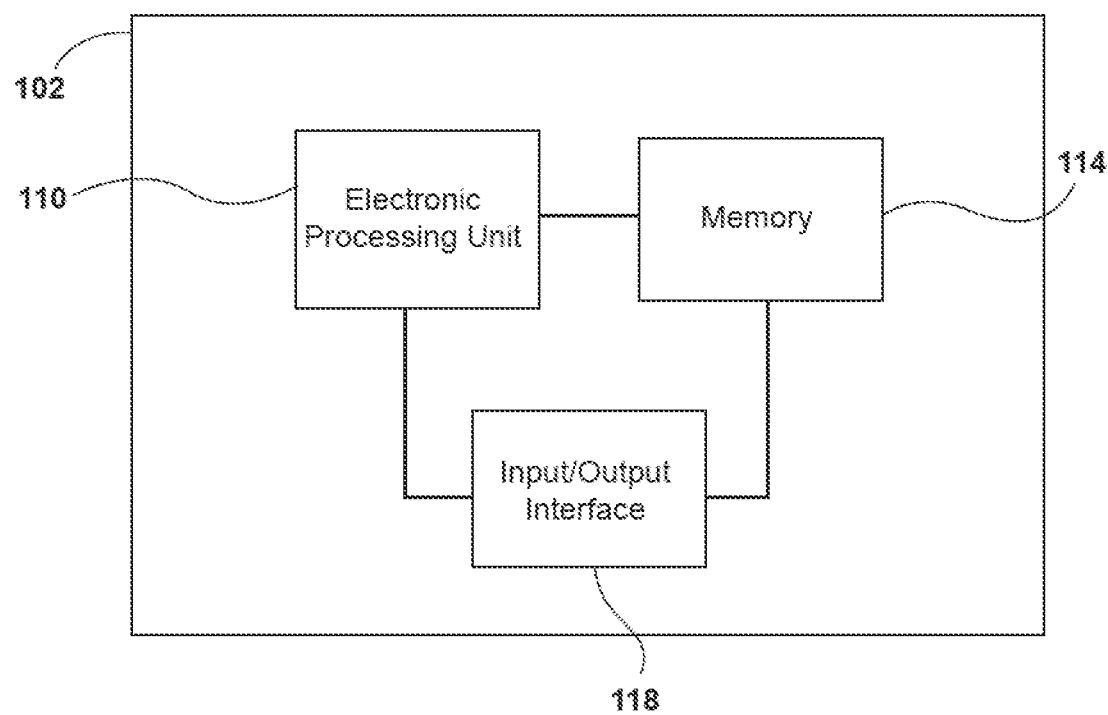
FIG. 3 is a block diagram of an electronic vehicle controller, according to some embodiments.

As illustrated in FIG. 3, in one embodiment, the occupant sensing controller 102 includes an electronic processing unit 110 (e.g., a microprocessor or another suitable programmable device), a non-transitory memory 114 (e.g., a computer-readable storage medium), and an input/output interface 118. In one embodiment, the input/output interface 118 enables the electronic processing unit 110 to communicate with the various devices illustrated in FIG. 2. The input/output interface 118 provides an electrical connection over the communication bus 34 or over a wired, wireless, or optical connection that enables the systems, controllers, and devices shown in FIG. 2 to communicate using network communications protocols.

The non-transitory memory 114 can include a program storage area (e.g., read only memory (ROM) and a data storage area (e.g., random access memory (RAM), and another non-transitory computer readable medium. The electronic processing unit 110 executes software stored in the memory 114. The software may include instructions and algorithms for performing methods as described herein.

The input/output interface 118 shown in FIG. 3 receives inputs and provides outputs to and from systems external to the occupant sensing controller 102, including the devices and systems shown in FIG. 2. In some embodiments, the occupant sensing controller 102 includes a plurality of electrical and electronic components that provide power, operational control, and protection to the components and modules within the interior occupant sensing system 100. It should be understood that the occupant sensing controller 102 may include additional, fewer, or different components.

Further, in one embodiment the electronic vehicle controller 32 has a similar structure as the occupant sensing controller 102, while executing different vehicle control programs.

Figure 4:
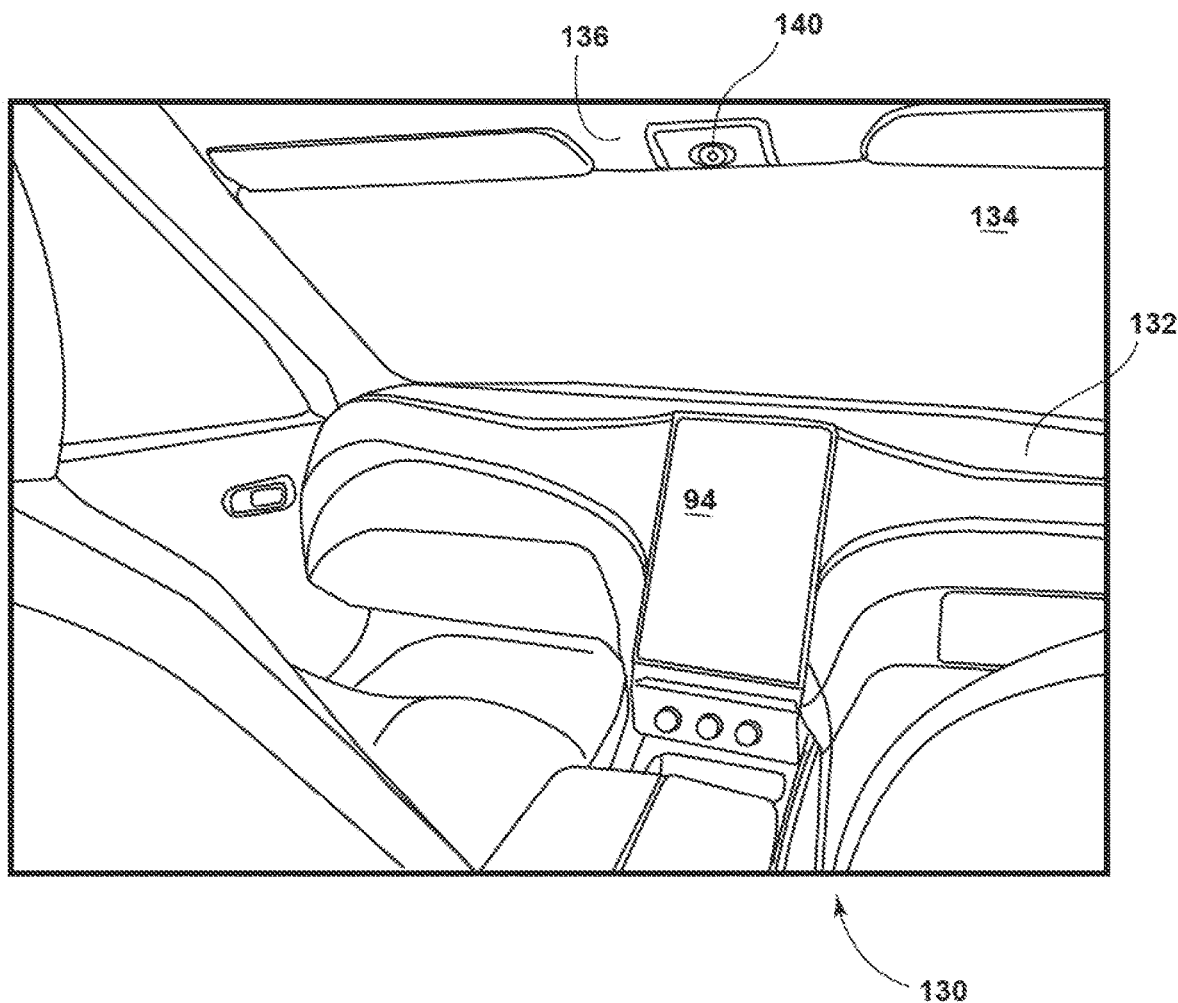
FIG. 4 is a front view of a dashboard of an autonomous vehicle, according to some embodiments.

FIG. 4 is a partial perspective view of a front interior portion 130 of an essentially fully autonomous vehicle 20 that includes a dashboard 132, a windshield 134 and a roof 136. The fully autonomous vehicle 20 is free from a steering wheel and pedals. An interior video camera 140 of the interior video camera system 104 is mounted to the roof 136 to obtain video data and images from within the interior of the autonomous vehicle 20. Further, FIG. 4 shows the human-machine interface 94, such as a touch screen.

Figure 5:
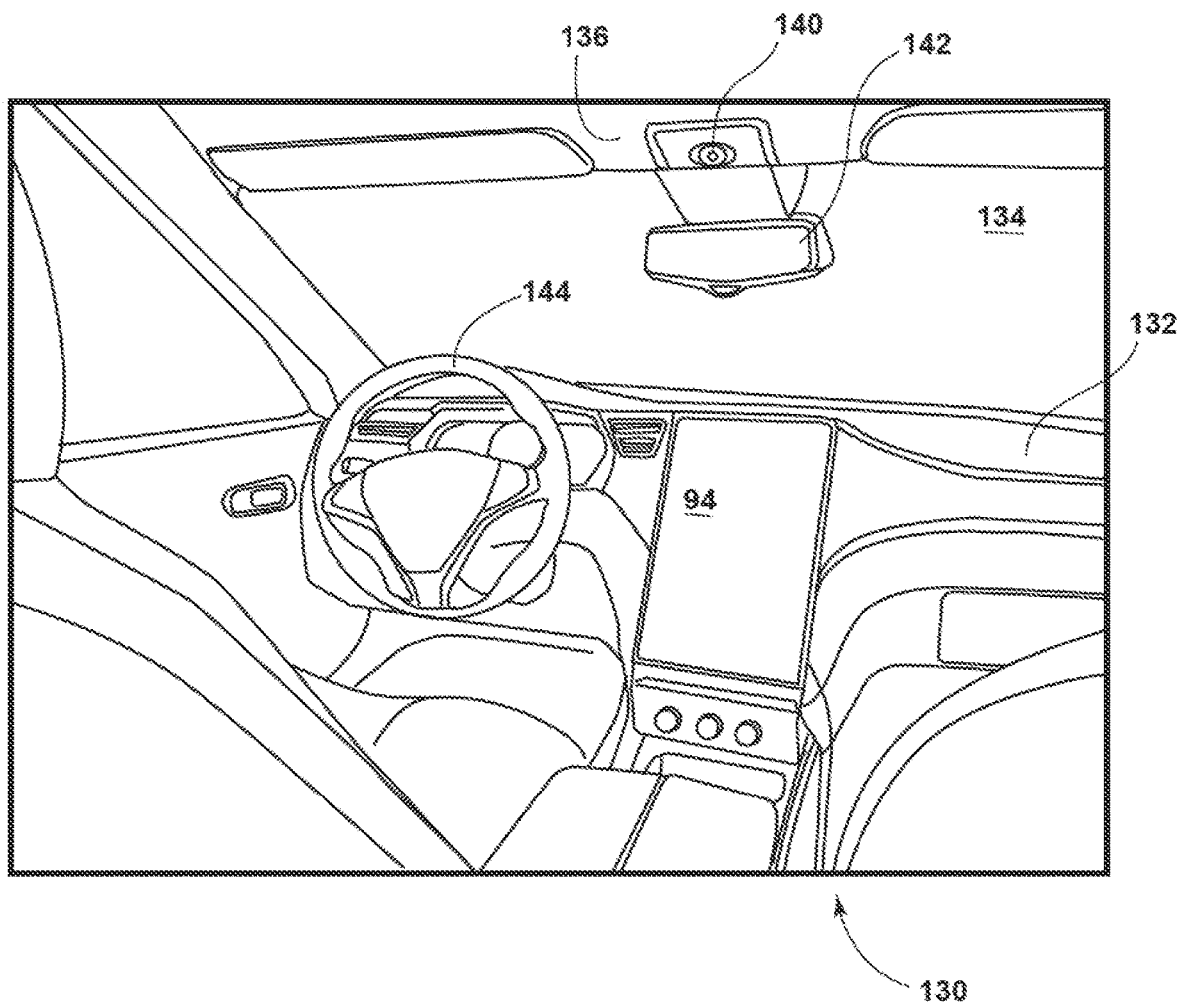
FIG. 5 is a front view of a dashboard of an autonomous vehicle, according to other embodiments.

FIG. 5 is a partial perspective view of a front interior portion 130 of an autonomous vehicle 20 that includes a dashboard 132, a windshield 134 and a roof 136. An interior video camera 140 of the interior video camera system 104 is mounted to the roof 136 to obtain video data and images from within the vehicle 20. Further, FIG. 5 shows the human-machine interface 94 and a rear view mirror 142 and a steering wheel 144. The vehicle 20 shown in FIG. 5 is operable autonomously or by a passenger or occupant located in the driving seat using the steering wheel 144, depending on the operating mode that is selected. Thus, the occupant at the steering wheel 144 is the occupant of importance in operating the vehicle control system 30 regardless of other older occupants present in the autonomous vehicle 20.

Parameters of Autonomous Vehicle

At a first stage, before the autonomous vehicle 20 is operated, an authorized custodian selects operating parameters of the vehicle. The authorized custodian is a vehicle owner or lessee of a private vehicle, or a custodian in the instance of a pay for hire vehicle. Moreover, the authorized custodian has the ability to restrict vehicle movement for user groups based on age, identity or other characteristics of the occupant. The authorized custodian has the ability to set rights for user groups using various methods including remotely accessing the vehicle 20 via home computer, tablet, smart phone, etc. linking to the external communication system 64 of the vehicle. Thus, remote inputs received from the custodian identify the users and user age groups. Alternatively, the custodian may set rights for user groups directly in the vehicle using the HMI 94. The authorized custodian must have a password or other access rights to make changes to the parameters of the vehicle 20.

First, a custodian selects age ranges for a "child," a "youth," a "teenager," and an "adult." Fewer or more age categories are contemplated.

As to a "child," the custodian selects disabling of the autonomous vehicle 20 from moving if the occupants are all children below a certain age, such as from four years old to seven years old or less. Further, the custodian may set parameters so that youths or teenagers are only able to go to certain destinations or geographical areas using certain routes that are assigned thereto. Further, the custodian may set unrestricted parameters when a user is above a minimum age. The custodian may also restrict manual driving control of vehicle based on age group/user identity (if the vehicle has a steering wheel and pedals).

In an embodiment, wherein a specific occupant is identified, such as a relative of the custodian, the custodian may authorize and assign specific routes and destinations to an identified user. For instance, in one embodiment, the custodian authorizes a youth to travel to destinations such as a work location, a school, and homes of select friends and/or relatives. Besides authorizing locations, the custodian can set different time parameters, wherein the autonomous vehicle 20 is available to travel to different destinations. Thus, a custodian chooses a plurality of preselected destinations in advance for each specific authorized individual.

A custodian also selects various alerts. The alerts are received on a smart phone or other mobile communication device carried by the custodian at a remote location. The selected alerts may include an authorized age occupant attempting to obtain manual driving control of the vehicle 20. Thus, if the vehicle control system 30 determines the occupant attempting to obtain driving control is authorized, the system permits the occupant to obtain manual driving control and provides the alert.

Further, the vehicle parameters can be configured to stop the vehicle and send an alert to the owner if: 1) the occupant unexpectedly leaves the vehicle during an autonomous trip; 2) if an un-expected occupant enters the vehicle during the trip; and/or 3) if the passengers are not properly restrained and seated in the vehicle. Further, in some embodiments, the vehicle parameters include streaming of video data from interior video camera system 104 and audio from the interior microphone and voice recognition system 96 for display and listening by the authorized custodian at a remote location with the mobile communication device. Further, the custodian may speak directly with the occupants with the vehicle loudspeakers. Further, during an autonomous trip, the custodian has the ability to check and store a vehicle location or vehicle position via GPS signals from the vehicle 20 and whether the occupant is in the vehicle.

In one embodiment, the autonomous vehicle is programmed with the above alerts and communication features to enable a custodian to send a specific recognized authorized individual, such as an identified child, in an autonomous vehicle to a destination.

Authorization of the Autonomous Vehicle

Figure 6:
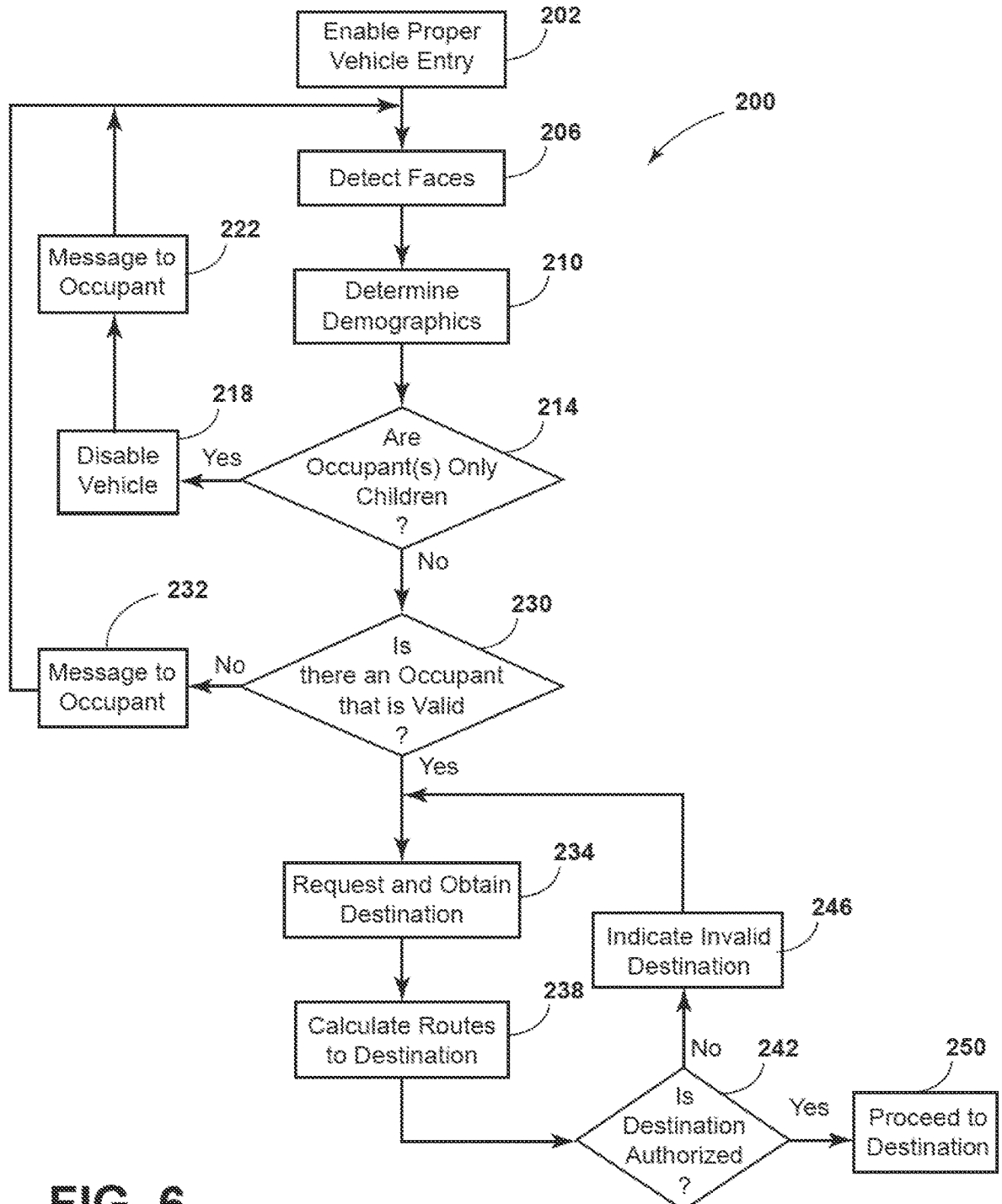
FIG. 6 is a flow chart for accessing and controlling an autonomous vehicle.

FIG. 6 is a flow chart 200 for authorization and use of an autonomous vehicle 20. In the embodiment shown in FIG. 6, access to the autonomous vehicle 20 (step 202) is provided in response to at least one from the group consisting of sensing actuation of a key fob, sensing a fingerprint with a fingerprint sensor 22 mounted on the vehicle, sensing actuation of a keypad, sensing an access signal from a smart phone, and in another embodiment, facial recognition of a specific authorized individual from video data obtained by the exterior video camera system 36 and processed by an appropriate controller.

Upon detection of proper vehicle entry, the interior video camera system 104 obtains video data and/or metadata for the faces (step 206) of all occupants disposed in the autonomous vehicle 20 and the occupant sensing controller 102 uses machine learning occupant detection algorithms to determine the number of faces, pose and location of each occupant that is detected.

For each face that is detected, demographic information and markers are estimated or determined (step 210) by the occupant sensing controller 102 executing classifier algorithms. Determining demographic information includes utilizing the video data or video images for a given occupant's face to classify age of the occupant. In some embodiments, determining demographic information includes classifying gender, ethnicity and/or race of an occupant. In some embodiments, other classification information is obtained. Thus, demographic information, and especially age of occupants, is determined for each individual occupant.

In some embodiments, the occupant sensing controller 102 is configured to improve classifier estimates as the occupant is tracked over time. Influences such as lighting, occupant movement, and occupant clothing may vary over time, causing occupant sensing controller 102 to make different demographic estimations over time. The occupant sensing controller 102 uses machine learning algorithms to improve its estimates by recognizing trends or eliminating outliers. This continuous improvement ensures the most reliable metadata.

Thereafter, the occupant sensing controller 102 determines whether the only occupants in the autonomous vehicle 20 are children (step 214). When the oldest occupant is a child, the vehicle is disabled (step 218) by the occupant sensing controller 102, by the vehicle controller 32, or by another or a combination of controllers (hereinafter "controller" corresponds to one or more of the controllers, controls or systems provided with the vehicle 20). Further, the controller provides a message to the occupants (step 222) with a visual display provided on the HMI 94 and/or an audio message output to vehicle interior speakers regarding the inability of the children to operate the vehicle or to select a destination. In one embodiment, an alert that a child is attempting to control the vehicle is provided to the custodian. Thereafter, the program returns to repeat the process by detecting faces (step 206).

When there is an occupant that is not a child (step 214), the occupant sensing controller 102 determines whether there is a valid user (step 230). In one embodiment, a valid user is a youth or an adult. In another embodiment, a valid user must be an adult only. Further classifications by age, such as "young adult" or "teenager" are contemplated.

When a valid occupant is not present in the vehicle (step 230), a message is provided to the occupant (step 232) indicating that use of the autonomous vehicle is not authorized. Thereafter, the occupant sensing controller 102 returns to detect faces (step 206).

When there is a valid occupant (step 230), the controller requests a destination from the occupants with an audio message and/or a visual display on the HMI 94 and thereafter, an occupant provides a destination either verbally as sensed by the interior microphone and voice recognition system 96 or by touch entries on the HMI 94 (step 234).

The controller utilizes the GPS navigation system 68 to determine the location of the autonomous vehicle and utilizes maps to calculate routes to the entered destination (step 238). Further, the physical orientation or vehicle position of the vehicle 20 at the location is determined by a magnetic sensor and/or from the GPS signals.

Thereafter, the controller determines whether traveling to the destination is authorized (step 242) for the valid occupant, such as a youth or adult. If the destination is not authorized, the controller provides an audio message in the vehicle 20 and/or a visual display on the HMI 94 indicating that the occupant is not permitted to travel to the particular destination (step 246). After providing the indication that the destination is not valid, the controller returns to request another destination (step 234).

When the controller determines that the destination is authorized, the controller operates the autonomous vehicle 20 to proceed to the valid selected destination (step 250). Details of autonomous operation are set forth in detail below.

Authorization of the Vehicle with Facial Recognition

Figure 7:
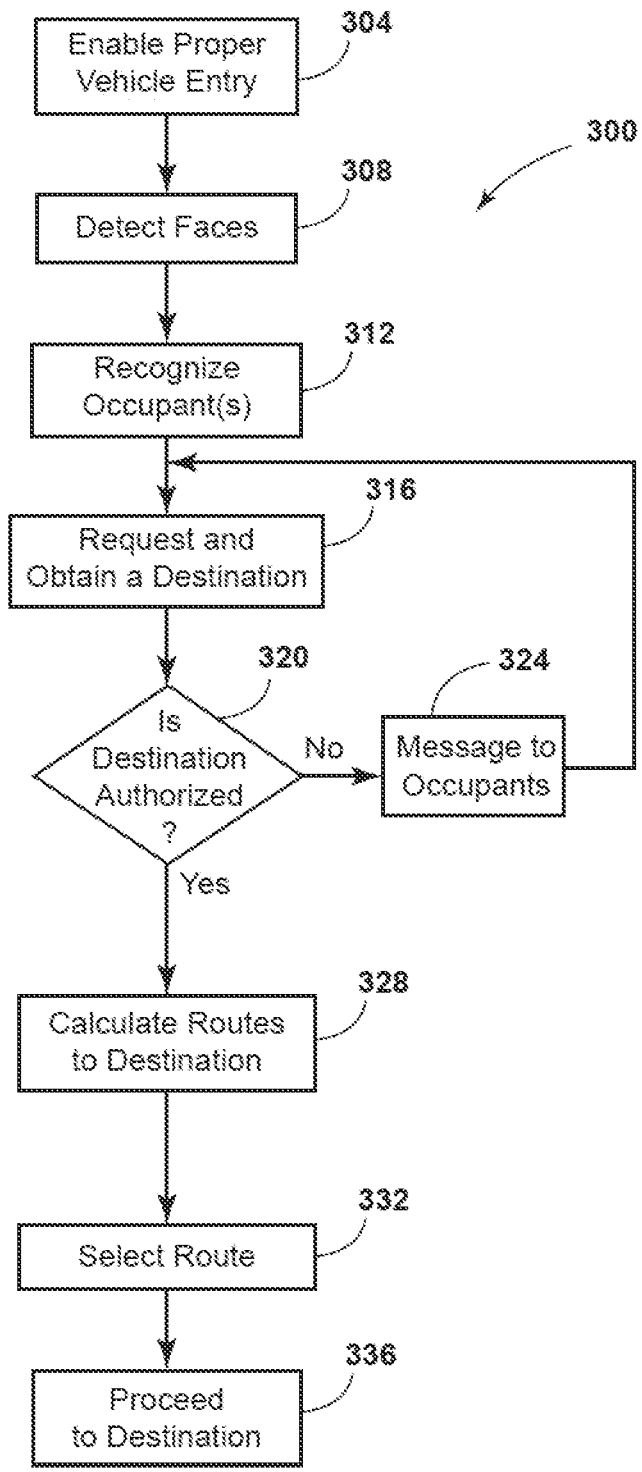
FIG. 7 is a flow chart for accessing and controlling an autonomous vehicle with facial recognition.

FIG. 7 is a flow chart 200 of another embodiment for authorization and use of an autonomous vehicle 20 based on facial recognition. In the embodiment shown in FIG. 7, access to the autonomous vehicle 20 (step 304) is provided in response to sensing actuation of a key fob and/or sensing a fingerprint with a fingerprint sensor 22 mounted on the vehicle 20. As set forth above, in some embodiments, access to the vehicle 20 is provided using a smart phone or facial recognition.

Upon detection of proper vehicle entry, the interior video camera system 104 obtains video data and/or metadata for the detected faces (step 308) of all occupants disposed in the autonomous vehicle 20 and the occupant sensing controller 102 uses machine learning occupant detection algorithms to determine the number of faces of occupants, the pose and the location of each occupant that is detected. More importantly, the occupant sensing controller 102 compares features from the various detected faces with stored faces of a plurality of authorized users of the vehicle. Thus, facial recognition provides information on identified specific authorized individual(s) for the autonomous vehicle 20 (step 312). If occupants are not detected, the faces of occupants are again detected by the interior video camera system 104 and the video data of occupants again compared with video data of a plurality of authorized users.

Besides providing information for specific authorized individuals, the custodian preselects destinations, routes, or areas that specific individuals are or are not authorized to travel to in the vehicle 20. In one embodiment, a limited list of destinations, for instance, home, work, friend's house, and school are provided for an authorized individual. Further, the hours of the day that a vehicle can be used for travel are selected by the custodian.

When there is an identified specific authorized individual recognized as an occupant (step 312), the controller requests a destination from the occupants with an audio message and/or a visual display on the HMI 94 and thereafter, an identified authorized occupant provides a destination either verbally as sensed by the interior microphone and voice recognition system 96 or by touch entries on the HMI 94 (step 316).

Thereafter, the controller determines whether traveling to the entered destination is authorized (step 320) for the identified authorized occupant, such as a youth, teen or adult. If the destination is not authorized, the controller provides an audio message in the vehicle 20 and/or a visual display on the HMI 94 indicating that the occupant is not permitted to travel to the particular destination (step 324). Thereafter, the controller returns to request another destination (step 316).

When the controller determines that the destination is approved or authorized (step 320), the controller utilizes the GPS navigation system 68 to determine the location of the autonomous vehicle 20 and utilizes stored maps to calculate routes to the entered destination (step 328). In some embodiments, routes that travel through areas that are not desired for access by the authorized occupant are not offered as a selection. Thus, the displayed authorized route or authorized routes are not always the fastest route to the selected destination. Then, the authorized occupant selects a route to the destination (step 332). Thereafter, the autonomous vehicle 20 proceeds to the destination (step 336).

In yet another embodiment, facial recognition of a specific authorized individual from video data obtained by the exterior video camera system 36 is processed by an appropriate controller. Such a facial recognition arrangement for video data from the exterior video camera system of a user approaching the vehicle 20 would result in advancement to step 316 in FIG. 7. As the detection of faces and recognition of occupant(s) occurs initially and enables entry into the vehicle.

In some embodiments, multiple authorized individuals are occupants of the vehicle 20 at the same time. In this instance, the vehicle 20 proceeds to any destination that is available for any one of the occupants. Alerts in regard to the unrecognized and recognized occupants, along with the location of the vehicle 20 are selectively provided to the custodian.

Driving Operation of the Autonomous Vehicle

Figure 8:
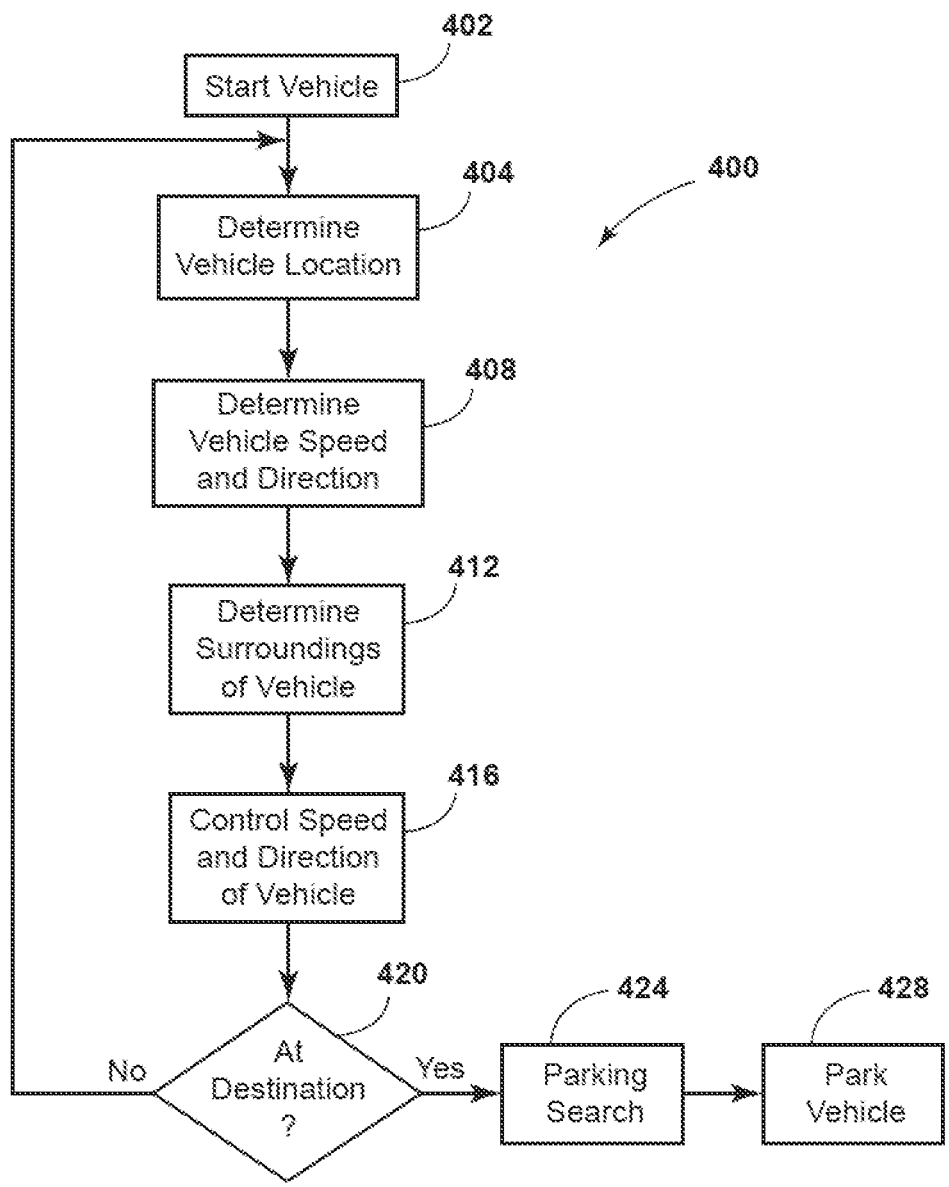
FIG. 8 is a flow chart directed to controlling an autonomous vehicle to a destination.

FIG. 8 is a flow chart 400 illustrating driving operations for the autonomous vehicle 20 for proceeding to a destination. Upon setting of the destination and approval or authorization thereof, an occupant starts the autonomous vehicle 20 (step 402) to begin to travel to the selected destination. In one embodiment, the autonomous vehicle operates as follows.

Upon starting the autonomous vehicle 20, in one embodiment by selecting a route displayed on the HMI 94 (step 402), minimal human intervention is needed. The vehicle control system 30 drives to the selected destination. Occupants have access to a vehicle stop control displayed on the HMI 94 or a voice command to stop the vehicle in an emergency or other situation. In operation, the electronic vehicle controller 32 determines the vehicle location (step 404). This determination is provided by the electronic vehicle controller 32 processing coordinates from the GPS navigation system 68 and in some instances, also information received by the external communication system 64.

Thereafter, the electronic vehicle controller 32 determines vehicle speed and direction (step 408). These determinations are made by a vehicle speed and direction sensor 48. A steering angle sensor 50 is provided for determining immediate future direction and accounting for same. Further, acceleration/deceleration is determined to account for changes in vehicle speed.

The electronic vehicle controller 32 determines surroundings and objects about the autonomous vehicle (step 412). The determination is assisted by an exterior video camera system 36 that obtains video of objects, such as nearby vehicles, road lanes, road shoulder and other information. Determining surroundings of the vehicle 20 includes identifying stop signs, red lights, and other driving situations from video data or information from other sensors. Further, the radar system 38, the Lidar sensing system 40 and the ultrasonic sensing system 44 detect the presence, location, and speed of objects located near the autonomous vehicle 20. The objects include various vehicles, along with traffic barriers, tunnels and walls. The external communication system 64 communicates vehicle-to-vehicle (V2V) with nearby vehicles and communicates vehicle to infrastructure or with guidance beacons provided along a roadway to determine the location, the vehicle speed, and the direction of the nearby vehicles, and the location of other structures.

In response to the determined surroundings, which includes other vehicles, the roadway and stationary structures, the electronic vehicle controller 32 controls the vehicle speed and direction of travel for the autonomous vehicle 20 using the vehicle speed control 88 and the steering control 82 (step 416). Under some conditions, the vehicle braking system 90 operates to stop or slow the autonomous vehicle 20. Thus, the autonomous vehicle 20 follows the route toward the destination that was previously determined and stored by the vehicle.

The electronic vehicle controller 32 determines whether the vehicle 20 is at or near the destination (step 420). If the vehicle 20 is not at or near the destination, the program executed by the electronic vehicle controller 32 returns to again determine or update the vehicle location or position (step 404) and to store the vehicle location and execute the subsequent steps. In this manner, the autonomous vehicle proceeds to the destination.

When the electronic vehicle controller 32 determines that the vehicle 20 is at or near the destination (step 420), the program advances to perform a parking search (step 424). The parking search includes various methods including using images from the exterior video camera system 36 and/or manual inputs from an occupant provided by the HMI 94 that indicate a parking structure or other nearby area where parking is available or is likely available. Upon locating an available parking place, the electronic vehicle controller 32 executes parking of the vehicle based in large part on data provided by the ultrasonic sensing system 44 (step 428).

While the electronic vehicle controller 32 as set forth above as performing control of the autonomous vehicle 20, other electronic controllers provided with the steering control 82, the electronic stability control 84, the vehicle speed control 88, the vehicle braking system 90, and/or other vehicle systems 98, may assist or perform the operations of the vehicle controller 32.

Embodiments of the invention are implemented on fully autonomous vehicles to allow for the possibility of a young child or young children less than a certain age being permitted to travel long distances. For example, age-based detection of a vehicle operator can be used as a safeguard against a child operating a vehicle on their own. In addition, the occupant sensing controller 102 is configured to provide an alert to the custodian of the vehicle when a child is in a position to operate the controls of the vehicle 20.

In some implementations, the above described system is controlled using at least one controller. The electronic vehicle controller 32 can include one or more processing units (e.g., a processor, application specific integrated circuits ("ASIC"), etc.), one or more memory modules including non-transitory computer-readable medium, and one or more input/output interfaces. In some implementations, the electronic vehicle controller 32 can also include one or more internal sensors or systems. Further, the various components shown in FIG. 2, such as the steering control 82 and the electronic stability control 84 communicate directly with each other over the communication bus 34 or, in some instances, are provided with and controlled by the same processor or multiple processors.

The various components shown in FIG. 2 are for purposes of illustration and explanation only and do not limit the invention. For instance, the vehicle controller 32 can be a part of, or the main processor for the vehicle drive control arrangement 80. The components of the vehicle drive control arrangement 80 are integrated with other components in some embodiments. In one embodiment, the vehicle speed control 88 is combined with the electronic stability control 84. Thus, a processor performs both of the operations of stability and speed control by executing appropriate control programs or algorithms.

The term "youth" as discussed herein is intended to include any individual that is less than the age for possessing a valid driver's license or less than about 14 and 16 years old, along with being older than a child. In one embodiment, the age range of a "youth" is between about 7 years old and about 15 years old. The term "child" is intended to include any individual that is less than between 6 and 8 years old, depending on the embodiment. In another embodiment, a "child" is less than about 7 years old. In another embodiment, a "teen" is between 17 years old and 21 years old and an adult is 21 years old.

In one embodiment, the occupant sensing controller 102 is configured to perform machine learning functions. The database 60 stores one or more learning engines executable by the occupant sensing controller 102 to process data of occupants received from the interior video camera system 104 and the microphone and voice recognition system 96, and develop demographic metadata on the occupants of the vehicle 20. Machine learning generally refers to the ability of a computer application to learn without being explicitly programmed. In particular, a computer application performing machine learning (sometimes referred to as a learning engine) is configured to develop an algorithm based on training data. For example, to perform supervised learning, the training data includes example inputs and corresponding desired (e.g., actual) outputs, and the learning engine progressively develops a model that maps inputs to the outputs included in the training data. Machine learning can be performed using various types of methods and mechanisms including, but not limited to, decision tree learning, association rule learning, artificial neural networks, inductive logic programming, support vector machines, clustering, Bayesian networks, reinforcement learning, representation learning, similarity and metric learning, sparse dictionary learning, and genetic algorithms.

In an embodiment directed to an autonomous vehicle 20 that is a pay for hire vehicle, the travel or operation of the vehicle is limited by an operating range and fuel or charge supply of the vehicle.

Thus, the invention provides, among other things, a method and apparatus for controlling access and use of an autonomous vehicle 20 by various occupants based on age of occupants or for a recognized specific authorized individual. Various features and advantages of the invention are set forth in the following claims.

What is claimed is:

1. A method for controlling use of an autonomous ridesharing vehicle including an interior occupant sensing system having an occupant sensing controller to obtain data of occupants including video data, comprising:
   operating at least one video camera to obtain the video data of occupants in the autonomous ridesharing vehicle;
   providing the video data to the occupant sensing controller;
   detecting a number of faces of occupants disposed in the autonomous ridesharing vehicle;
   determining demographic information from the video data of each of the detected faces;
   storing a vehicle location, the number of faces, and the demographic information for occupants as data in the autonomous ridesharing vehicle;
   determining from the demographic information an age of occupants in the autonomous ridesharing vehicle, and
   when the demographic information indicates that all occupants in the autonomous ridesharing vehicle are less than a certain age, limiting travel to a destination in response to age.

2. The method according to claim 1, wherein the data of occupants is metadata, wherein the autonomous ridesharing vehicle is a fully autonomous ridesharing vehicle, and
   only when the interior occupant sensing system determines that all occupants are at least a certain age and seated properly within the fully autonomous ridesharing vehicle, is the fully autonomous ridesharing vehicle operable to travel to a selected destination that is one of a plurality of preselected destinations determined in advance by a custodian.

3. The method according to claim 1, wherein the autonomous ridesharing vehicle is a pay for hire vehicle and travel or operation of the autonomous ridesharing vehicle is limited by an operating range and fuel or charge supply of the autonomous ridesharing vehicle.

4. The method according to claim 1, further including:
upon determining from the demographic information that an occupant of the autonomous ridesharing vehicle is an adult, requesting the destination:
receiving the destination from an occupant that is an adult,
determining whether providing travel or operation of the autonomous ridesharing vehicle to the destination is authorized,
when authorized, determining a route to the destination and operating the autonomous ridesharing vehicle to the destination, and
when not authorized, providing an indication that the destination is not valid, and upon determining from the demographic information that an oldest occupant of the autonomous ridesharing vehicle is a youth having an age in an age range that is older than between 6 and 8 years old and less than between 14 and 16 years old, requesting the destination:
receiving the destination from an occupant that is a youth,
determining whether providing travel or operation of the autonomous ridesharing vehicle to the destination is authorized,
when authorized, determining the route to the destination and operating the autonomous ridesharing vehicle to the destination, and
when not authorized, providing the indication that the destination is not valid.

5. The method according to claim 4, wherein the age range of a youth is between about 7 years old and about 15 years old.

6. The method according to claim 1, wherein the autonomous ridesharing vehicle is a private vehicle, the method including
providing access to the autonomous ridesharing vehicle in response to at least one from a group consisting of sensing actuation of a key fob, sensing a fingerprint with a fingerprint sensor, sensing actuation of a keypad, sensing an access signal from a smart phone and providing facial recognition of a specific authorized individual from video data, and
wherein the destinations and operation of the autonomous ridesharing vehicle is preselected for occupants by inputs previously received from a custodian by entry remotely or by entry with a human-machine interface of the autonomous ridesharing vehicle.

7. The method according to claim 1, further including:
determining when an occupant in the autonomous ridesharing vehicle is attempting to obtain manual driving control of the autonomous ridesharing vehicle,
permitting the occupant to obtain the manual driving control of the autonomous ridesharing vehicle when the demographic information indicates that the occupant is of driving age, and
providing an alert to an authorized custodian at a remote location that the occupant is obtaining the manual driving control of the autonomous ridesharing vehicle.

8. The method according to claim 7, further including providing an alert to the authorized custodian when an occupant unexpectedly leaves the autonomous ridesharing vehicle during an autonomous trip, when an occupant unexpectedly enters the vehicle during autonomous travel, and when an occupant is not properly seated in the autonomous ridesharing vehicle.

9. The method according to claim 1, further including
obtaining a GPS signal for determining a vehicle location of the autonomous ridesharing vehicle,
providing the vehicle location and the number of faces as metadata to a mobile communication device at a remote location, and
determining a route to a destination based on the GPS signal and map information.

10. The method according to claim 1, wherein when the demographic information determines that a child is located in the autonomous ridesharing vehicle without another occupant, selecting of the destination and operation of the autonomous ridesharing vehicle is disabled.

11. The method according to claim 1, wherein the autonomous ridesharing vehicle is free from a steering wheel.

12. A method for controlling use of an autonomous ridesharing vehicle including an interior occupant sensing system to obtain data of occupants including video data, comprising:
operating at least one video camera of the interior occupant sensing system to obtain the video data of occupants in the autonomous ridesharing vehicle;
providing the video data to an occupant sensing controller of the interior occupant sensing system; and
recognizing a face of at least one occupant disposed in the autonomous ridesharing vehicle, wherein the occupant that is recognized is a specific authorized individual and routes and destinations of use of the autonomous ridesharing vehicle are provided for the specific authorized individual, and wherein different specific authorized individuals have different authorized routes and destinations of use and different authorized times of use.

13. The method according to claim 12, further including
upon recognizing that an occupant of the autonomous ridesharing vehicle is the specific authorized individual, selecting a destination:
receiving a route and a destination from the specific authorized individual,
determining whether providing travel or operation of the autonomous ridesharing vehicle to the destination is authorized for the specific authorized individual,
when authorized, operating the autonomous ridesharing vehicle to the destination.

14. The method according to claim 12, further including:
determining when the specific authorized individual in the autonomous ridesharing vehicle is attempting to obtain a manual driving control of the autonomous ridesharing vehicle,
permitting the specific authorized individual to obtain the manual driving control of the autonomous ridesharing vehicle, and
providing an alert to an authorized custodian at a remote location that the specific authorized individual is obtaining the manual driving control of the autonomous ridesharing vehicle.

15. The method according to claim 14, further including providing an alert to the authorized custodian when an occupant unexpectedly leaves the autonomous ridesharing vehicle during an autonomous trip, when an occupant unexpectedly enters the autonomous ridesharing vehicle during an autonomous trip, and when an occupant is not properly seated in the autonomous ridesharing vehicle.

16. A vehicle control system for access and operation of an autonomous ridesharing vehicle comprising:
a vehicle controller;
an interior occupant sensing system to obtain data of occupants that includes video data, the interior occupant sensing system including
at least one video camera to obtain the video data of occupants in the autonomous ridesharing vehicle; and
an occupant sensing controller for receiving the video data, the occupant sensing controller configured to:
detect a number of faces of occupants disposed in the autonomous ridesharing vehicle;
determine demographic information from the video data of each of the detected number of faces;
store a vehicle location, the number of faces, and the demographic information for occupants as data in the autonomous ridesharing vehicle;
determine from the demographic information an age of occupants in the autonomous ridesharing vehicle, and
provide the demographic information including an age of occupants to the vehicle controller,
wherein the vehicle controller is configured to, in response to the demographic information indicating that all occupants in the autonomous ridesharing vehicle are less than a certain age, limit travel to a destination in response to the certain age.

17. The vehicle control system according to claim 16, further including a fingerprint sensing system including a fingerprint sensor for providing an access to an interior of the autonomous ridesharing vehicle.

18. The vehicle control system according to claim 16, wherein the vehicle controller is configured to, upon receiving the demographic information indicating that an oldest occupant of the autonomous ridesharing vehicle is a youth, request a destination,
receive a destination from an occupant that is a youth,
determine whether providing travel or operation of the autonomous ridesharing vehicle to the destination is authorized,
when authorized, determine a route to the destination and operating the autonomous ridesharing vehicle to the destination, and
when not authorized, providing an indication that the destination is not valid.

19. The vehicle control system according to claim 16, including a GPS navigation system for receiving GPS signals, the GPS navigation system configured to determine the vehicle location of the autonomous ridesharing vehicle,
wherein the vehicle controller configured to determine a route to the destination based on the GPS signals and map information, and
wherein the autonomous ridesharing vehicle is free from a steering wheel.

20. A vehicle control system for access and operation of an autonomous ridesharing vehicle comprising:
a vehicle controller; and
an interior occupant sensing system to obtain data of occupants that includes video data, the interior occupant sensing system including
at least one video camera to obtain the video data of occupants in the vehicle; and
an occupant sensing controller for receiving the video data, the occupant sensing controller configured to recognize a face of at least one occupant disposed in the vehicle,
wherein the occupant that is recognized is a specific authorized individual and routes and destinations of use of the autonomous ridesharing vehicle are provided for the specific authorized individual, and wherein different specific authorized individuals have different authorized routes and destinations of use and different authorized times of use.

* * * * *